Feb. 21, 1967  T. O. SUMMERS  3,304,789
ERECTION SYSTEM FOR GYROSCOPE
Filed May 23, 1962  6 Sheets-Sheet 4

THOMAS O. SUMMERS,
INVENTOR.

BY R. E. Geauque

ATTORNEY

Feb. 21, 1967 T. O. SUMMERS 3,304,789
ERECTION SYSTEM FOR GYROSCOPE
Filed May 23, 1962 6 Sheets-Sheet 5

THOMAS O. SUMMERS,
INVENTOR.

BY R. E. Geaugue
ATTORNEY

Feb. 21, 1967     T. O. SUMMERS     3,304,789
ERECTION SYSTEM FOR GYROSCOPE
Filed May 23, 1962     6 Sheets-Sheet 6

THOMAS O SUMMERS,
INVENTOR.

BY R.E. Geangue
ATTORNEY

# United States Patent Office 3,304,789
Patented Feb. 21, 1967

3,304,789
ERECTION SYSTEM FOR GYROSCOPE
Thomas O. Summers, 4097 Valley Meadow Road,
Encino, Calif. 91316
Filed May 23, 1962, Ser. No. 197,830
18 Claims. (Cl. 74—5.45)

This invention relates to an erection system for gyroscopes and more particularly to an erection system which converts the friction of one or more members movable relative to the gimbal of a gyroscope, into an erection torque, such friction including bearing friction, slip ring friction and potentiometer friction, utilized either singularly or in combination.

In present gyroverticals, it is recognized that static bearing friction and slip ring friction and potentiometer friction produce undesirable erection torques on the gyroscope during normal operation of the gyro, and it has been attempted to hold these friction levels as low as possible through the use of very expensive and very exacting manufacturing procedures. In the interest of reliability in conventional gyro verticals, it is the practice to set the value of the erecting torque at some increment above the maximum value which the disturbing friction torque can possibly attain under the extremes of various environmental conditions. Thus, the erecting precession rate might be marginally low when these friction sources (including the bearing and slip ring friction), assume a maximum value, such as when the gyro is exposed to extremely low temperature. On the other hand, when the gyro is running at a comparatively high temperature under normal conditions, the opposing friction source can be very low with the result that the precession rate can be extremely high and acceleration error correspondingly great. Consequently, due to the various environmental conditions the gyro encounters, the precession rate assumes various values. Ideally, of course, the precession rate should be low and constant and the value of the erecting torque would change in direct proportion to the value of the disturbing gimbal friction.

In the present invention, the gyro is erected with the various members that cause the friction. With such an arrangement, the erecting torque is never substantially greater than the friction torque and consequently, the precession rate will always remain low and constant. Neglecting minor error-producing sources, such as unbalance and apparent errors produced by the earth's rotation, the real accuracy limitation is gimbal friction and utilizing this same friction to erect a gyro, such limitation is minimized. Bearings are, of course, necessary to support both the inner and outer gimbal axes, and slip rings are expedient to conduct current to the gyro motor and to provide external means for controlling the gyro. Slip rings are also necessary for the potentiometer pick-offs and the gravity sensor located on the inner and outer gimbals.

Basically, the present invention contemplates broadly the rotation or oscillation of the bearing races or the slip rings or the potentiometer winding, either singularly or together, to produce an erecting torque about one or more of the gimbal axes. In one form of the invention, the erecting member or members can be continually rotated in the proper direction by the required amount until the gyro has erected to the vertical as indicated by the gravity sensor and thereafter remain in- effective until such time as erecting is again called for. In another form of the invention, the erecting member or members can be continually oscillated by a driving motor and can move for a greater time in one direction than in the other in order to produce the required erecting force. Since the erecting force is kinetic friction and substantially independent of the speed of movement of the erecting member, the force is proportional to the time the member is moved relative to the gimbal shaft. In another form of the invention, the amplitude of movement of the oscillating member or members can be held constant in the forward and reverse direction and the speed of the motor can be controlled by the gravity sensor so that the motor moves faster in one direction than in the other. This provides an erection component in the direction in which the motor moves slower since the erection force will exist for a greater period of time, even though the amplitude of oscillation is constant.

The reliability of the gyrovertical of the present invention is not impaired by ordinary variations in gimbal and slip ring friction since the erecting torque, controlled by gravity sensors does not exceed gimbal friction torque. The error producing torques due to gimbal bearing, potentiometer and/or slip ring friction actually erect the gyro and thus, the erecting torque equals the error producing torque.

While the error producing torque and the erecting torque are equal, the rate of the erecting precession is not proportional to the friction or uncertainty level of the gimbal bearings and slip rings when the friction producing members are continually oscillated during erection. In this case, the erecting rate is below the rate that would be produced by the continuous application of a torque equal in value to the instantaneous error torque resulting from gimbal bearing, slip ring and potentiometer friction. The oscillation of the slip rings, gimbal bearings and/or potentiometer through equal distances at constant rates cancels the influence of torques due to friction. So long as the gravity sensor detects no error of the spin axis from the vertical, this constant oscillation continues to be of constant amplitude. However, in the event of an error signal from the gravity sensor, an erecting torque is developed about the appropriate gimbal axis. This is accomplished by rotating the gimbal bearings, slip rings and/or potentiometer wiper about the appropriate axis and the effect is to apply a differential erecting torque to the gyro that is well below the instantaneous torque attributable to friction producing members.

While it is contemplated that the novel erection means will be utilized about both gimbal axes, it is understood that the novel erecting mechanism can be used only about the outer gimbal axis and a standard torquing mechanism can be used about the inner gimbal axis. In the embodiments of the invention in which the erecting member or members continually oscillate only about the outer gimbal axis, the only friction encountered about the inner gimbal would be kinetic friction of the bearings and slip rings of the inner gimbal, since the oscillation of the friction members about the outer gimbal is continually torquing the outer gimbal clockwise and counterclockwise with a substantially high torque, with the result that the inner gimbal is oscillated at the oscillating frequency of the outer gimbal members. The resulting amplitude of the inner gimbal, though so small as to be indiscernible, nevertheless causes the inner gimbal to encounter only kinetic friction. Static friction is thus precluded about the inner gimbal (which is already comparatively friction free) requiring only a very low erecting torque to assure positive control over its precession.

It is therefore an object of the present invention to provide an erection system for gyroscopes which utilizes kinetic friction produced by a member or members moving about a gimbal axis, as the erecting torque about the gimbal axis.

Another object of the present invention is to provide an erection system for gyroscopes which utilizes bearing friction or slip ring friction or potentiometer friction, either singularly or in combination, to produce the erecting force, said friction developing member or members being moved in response to a gravity sensing means to produce the erecting friction.

Another object of the present invention is to provide an erecting system for gyroscopes in which bearing or slip ring friction or potentiometer friction, either singularly or together, produces an erecting torque and in which the erecting member or members oscillate in such a manner that the time in which the friction is acting in one direction exceeds the time in which friction acts in the other direction, thus producing an overall erecting component of frictional force.

Another object of the present invention is to provide an erection system for gyroscopes utilizing the bearing friction, slip ring friction or potentiometer friction, either singularly or together, as the erecting force, said erecting member or members being driven in only the direction required to produce the erecting frictional force, and thereafter being ineffective until such time as additional erecting force is required.

A further object of the invention is to provide an erecting system for gyroscopes which utilizes a member or members rotating relative to a gimbal axis of the gyroscope for producing a frictional erecting torque about the axis, said erecting torque resulting either from continual relative rotation in one direction only, or from oscillatory motion which results in unequal torques in opposite directions to provide a net erecting torque.

These and other objects of the invention not specifically set forth above will become readily apparent from the accompanying description and drawings, in which.

The embodiment of the invention illustrated in FIGURES 1–6 comprises a gyroscopic instrument having a casing 20 in which is mounted an outer gimbal 21 and an inner gimbal 22. The outer gimbal is rotatably supported by shafts 23 and 24 which are mounted in ends 25 and 26, respectively, of the casing. The end 26 is integral with cylindrical side wall 27 of the casing, and the end 25 is secured to the side wall 27 by a plurality of bolts 28 screwed into fittings 29 carried by the side wall 27. Normally the casing 20 is located within a movable craft so that the axis of shafts 23 and 24 lies along the roll axis of the craft, and the instrument has a roll potentiometer 30 which serves to produce the output of the gyro, namely a roll signal.

Slip ring construction for outer gimbal

Figure 1:
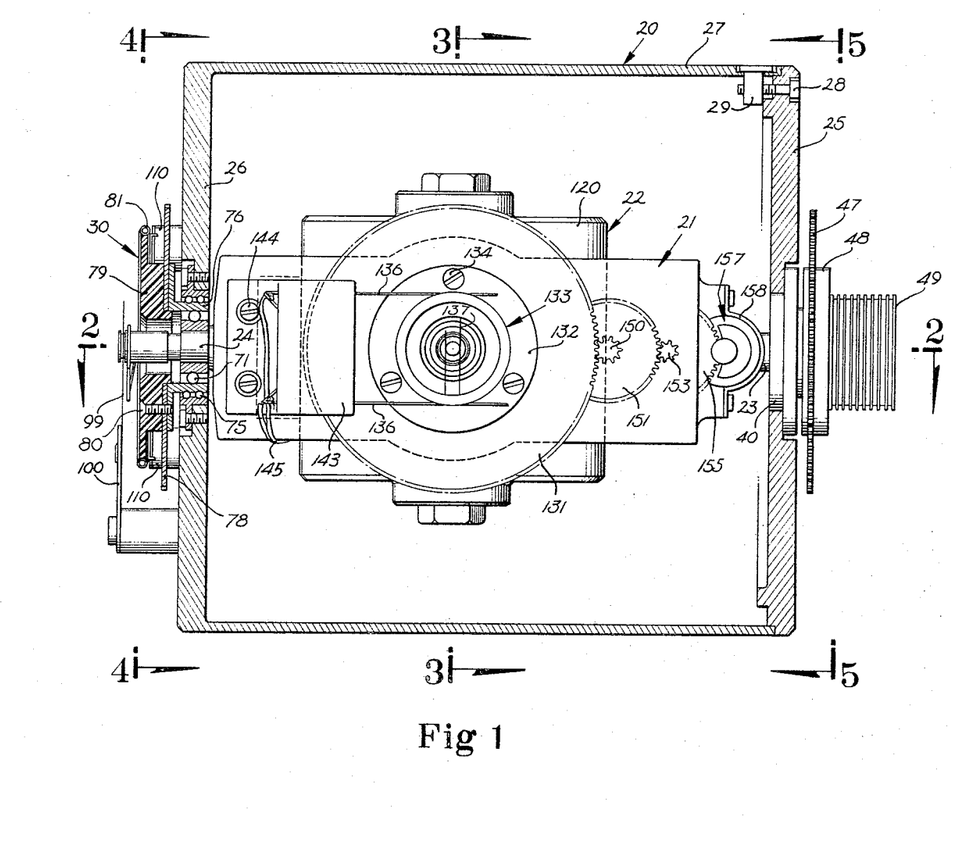
FIGURE 1 is a sectional view of the gyro of the subject invention enclosed within a suitable casing.

The shaft 23 has a reduced section 23a which mounts inner race 32 for the single row of ball bearings 33. A further reduced shaft section 23b has secured thereto the slip ring construction 34 which serves to conduct current to leads 35 passing through opening 36 in the shaft 23. A portion of the leads 35 are directed through an axis of the inner gimbal in order to supply current to the inner gimbal gravity sensor and to the gyro motor mounted in the inner gimbal.

An outer ball bearing race 40 is secured to the end 25 of casing 20 by a plurality of bolts 41 passing through flange 42 on the outer race. In addition, an intermediate, redundant ball bearing race 44 is located between the inner race 32 and the outer race 40 and this race separates ball bearings 33 from a double row of ball bearings 45. Thus, the intermediate race 44 serves as the outer race for the single row of balls 33 and serves as the inner race for the double row of balls 45, and the inner race 44 can move relative to both of these sets of ball bearings.

Figure 5:
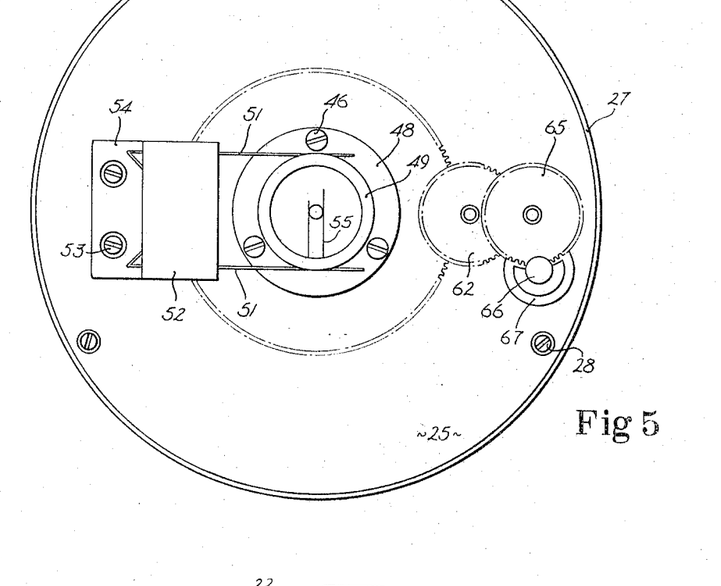
FIGURE 5 is an elevational view taken along line 5—5 of FIGURE 1 showing the slip ring construction located about the outer gimbal axis.

A gear 47 and a cylindrical slip ring support 48 are secured to flange 44a of the intermediate race 44 by bolts 46 (see FIGURE 5), an extension 49 on the slip ring support 48 comprises a redundant slip ring member which carries a plurality of metallic slip rings 50 located in separate grooves. Referring to FIGURE 5, a pair of wipers 51 bear against each slip ring 50 and all pairs of wipers are supported by an insulated block 52 secured to the end 25 of the casing 20 by bolts 53 passing through a leg 54 of the block. Also, a pair of wipers 55 are connected to each of the slip rings 50 within the interior of extension 49, and each pair of wipers 55 bears on a separate slip ring 56 on the construction 34 carried by the reduced shaft section 23b. A cable 57 contains a plurality of conductors 58, each of which connects with the end of a single pair of wipers 51 so that each pair of wipers 51 and 55 provide a separate circuit for current passing through the outer gimbal shaft 23.

Referring again to FIGURE 2, the gear 47 meshes with gear 60 carried by shaft 61 of gear 62, and gear 62 in turn meshes with a reduced gear 63 carried by shaft 64 for gear 65. Gear 65 is driven by the gear 66 connected to the shaft of a motor 67 which is secured within an opening in the end 25 of the casing. The motor 67 is energized by leads 68 which connect directly with the power cable 57. In operation, the motor 67 will drive the intermediate bearing race 44 and slip ring extension 49 through the gear train, including gears 66, 65, 62 and 47. As will be later described, the motor 67 is normally energized to move the intermediate race 44 and the slip ring extension 49 for equal times in opposite directions when the outer gimbal is in its gravity erected position, and because of this oscillation, only kinetic friction will be created by the bearings and wipers located about shaft 23. Therefore, movement of the mounting craft relative to the inner gimbal will not produce unwanted torques, as results when these members are stationary and produce static friction force upon such movement of the craft. Also, because of the oscillation, the kinetic friction of the wipers 51 and 55 and of the bearings 33 and 45 will produce slight torques about shaft 23. However, these torques will be equal and opposite in magnitude and therefore will cancel out so that the outer gimbal will remain in its gravity vertical position.

*Potentiometer construction for outer gimbal*

Referring again to FIGURES 1 and 2, the shaft 24 carries an inner race 70 for the single row of ball bearings 71. An outer race 72 has a flange 73 secured to the end 26 of the casing by a plurality of bolts 74 and the outer race engages a double row of ball bearings 75. An intermediate, redundant bearing race 76 is located between the balls 71 and 75 and has a flange 77, which supports a gear 78 and an insulated potentiometer block 79 by means of a pluarlity of screws 80. A winding 81 is secured around the periphery of the block 79 so that the winding 81 and the intermediate race 76 move with the gear 78.

Figure 2:
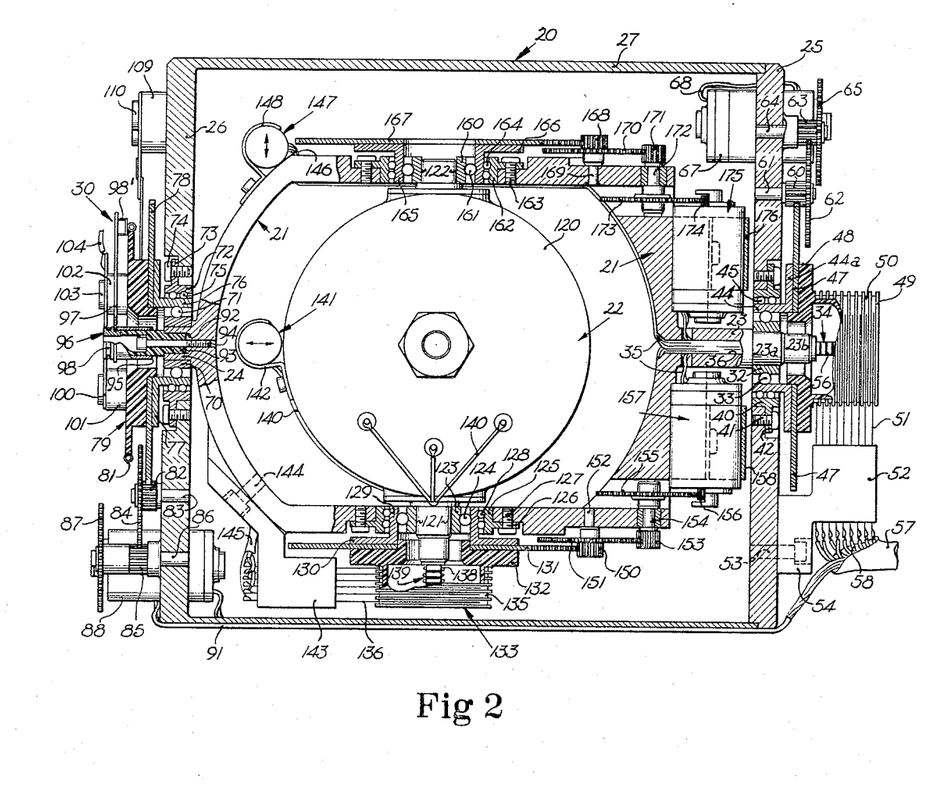
FIGURE 2 is a horizontal section along line 2—2 of FIGURE 1 showing the inner gimbal casing rotatably mounted on the outer gimbal.

The gear 78 meshes with the small gear 82 carried by shaft 83 for larger gear 84, and the gear 84 meshes with small gear 85 carried by shaft 86 for larger gear 87. A motor 88 is supported in an opening in the end 26 of the casing and drives a pinion gear 90 which meshes with the large gear 87. Leads 91 for the motor 88 are led directly from the cable 57.

Figure 4:
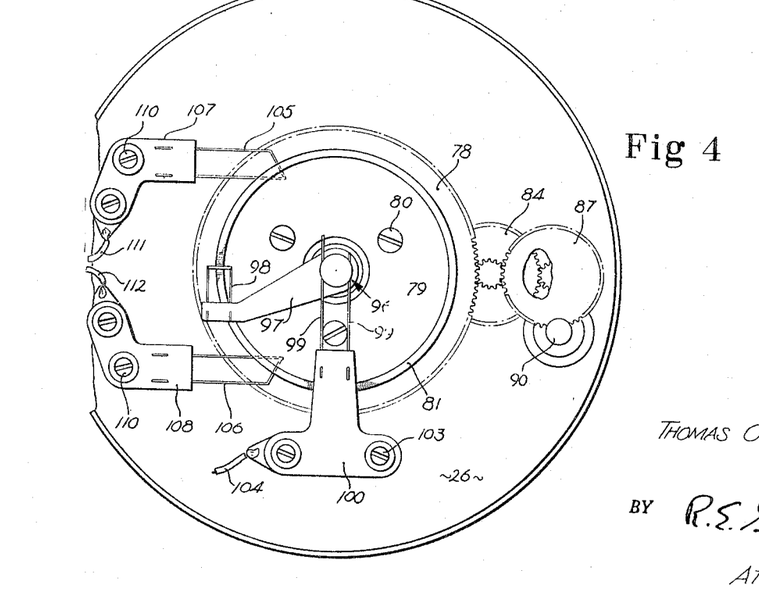
FIGURE 4 is an elevational view taken along line 4—4 of FIGURE 1 showing the roll potentiometer located about the outer gimbal axis.

The end of shaft 24 contains an opening 92 which receives an insulated plug 93 and the plug is secured by the bolt 94. The end of plug 93 is inserted into the end 95 of the conducting member 96, which supports a wiper arm 97 and a slip ring 98. As illustrated in FIGURE 4, wiper arm 97 carries a wiper 98′ which continually bears against the winding 81, and the signal picked off by the wiper is transmitted by a pair of wiper arms 99 which bear against the slip ring 98. Wiper arms 99 are carried by a conducting plate 100 supported by a pair of posts 101 and 102 which are secured to end 26 of the casing by means of bolts 103. The plate 100 connects with lead 104 which conducts the signal output of the instrument to any suitable actuator or indicator or the like.

A pair of wipers 105 and 106 are located on opposite sides of the wiper 98′ and are supported, respectively, by conducting plates 107 and 108. These plates are supported by insulated posts 109 secured to end 26 of the casing by means of bolts 110. Leads 111 and 112 connect with plates 107 and 108, respectively, and supply a potential differential between the wipers 105 and 106 which is continually effective across a portion of the winding 81 over which the wiper 98′ moves, even though the winding 81 also moves.

In operation, the motor 88 will normally oscillate the intermediate race 76 and the winding 81 so that the kinetic friction developed by the ball bearings 71 and 75 and by the wipers 105 and 106 will produce small erecting torques which are equal and opposite in direction so as not to disturb the position of the outer gimbal. Because of the continual oscillation of the friction producing members, movement of the craft with respect to the outer gimbal axis will not result in large unwanted erecting torques, such as would be produced by static friction of the members if no oscillation of these members were being continually produced. Since the wipers 105 and 106 are maintained a fixed distance apart and in continual contact with the winding 81, a continually changing section of the winding remains effective for the wiper 98′, even though the winding 81 is continually oscillating. Thus, the position of the wiper 98′ with respect to the wipers 105 and 106 will determine the output of the potentiometer 30.

*Slip ring construction for inner gimbal*

The inner gimbal 22 is in the form of a casing 120 which contains the gyro motor and rotor (not shown) which can be of any suitable well-known construction. The casing 120 is supported by shafts 121 and 122 which define the axis of the inner gimbal, and this axis corresponds with the pitch axis of the mounting craft when the axes of shafts 23 and 24 are aligned with the roll axis.

The shaft section 121 supports an inner bearing race 123 for a single row of ball bearings 124, and outer race 125 which engages two rows of ball bearings 128, has a flange 126 secured to the outer gimbal 21 by a plurality of bolts 127. An intermediate, redundant bearing race 129 is located between the ball bearings 124 and 128 and has a flange 130 to which is secured gear 131 and slip ring support 132 by a plurality of bolts 134. Extension 133 of support member 132 comprises a redundant slip ring member which carries a plurality of slip rings 135 separate from one another, and as illustrated in FIGURE 1, a pair of wipers 136 bear against each of the slip rings 135. A pair of wipers 137 is connected internally of extension 133 to each slip ring 135, and each pair of wipers 137 bears against one of the slip rings 138 carried by the member 139 secured to end of the shaft 121. The slip rings 138 connect with leads 140 passing through the shaft 121 and connecting with the gyro motor (not shown) and gravity sensor 141 secured to the inner gimbal casing by bracket 142.

Each pair of wipers 136 are supported by an insulated block 143 which is secured to the outer gimbal by bolts 144, and a cable 145 contains individual leads connecting separately with each of the wiper pairs 136. The cable 145 contains leads which have passed through the opening 36 in shaft 23 of the outer gimbal and these leads supply the leads 140. Other leads 146, which have passed through the shaft 23 of the outer gimbal, connect directly with a gravity sensor 147 carried on the outer gimbal by a bracket 148. The gravity sensors 141 and 147 are preferably in the form of photoelectric sensors, each of which is illuminated to produce an erecting signal when its mounting gimbal moves away from its gravity vertical position. However, it is understood that gravity sensors 141 and 147 can equally well be in the form of gravity sensing mercury switches having two sets of contacts, one set of which is closed depending upon which way the mounting gimbal deviates from its gravity vertical position.

Figure 3:
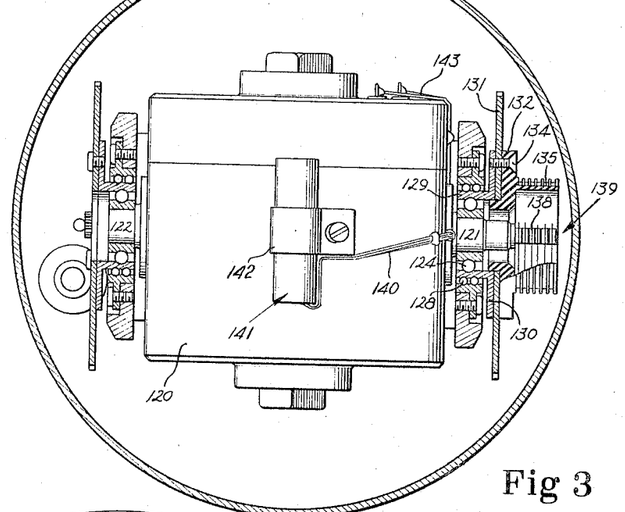
FIGURE 3 is a vertical section along line 3—3 of FIGURE 1 showing the bearings and slip rings for the inner gimbal of the gyroscope and the pitch sensitive gravity sensor mounted on the inner gimbal.

The gear 131, which is secured to the intermediate race 129 and to the slip ring member 132, meshes with a small gear 150 located adjacent large gear 151 on the shaft 152 carried by the outer gimbal. The large gear 151 meshes with the small gear 153 carried by the shaft 154, which also carries a large gear 155 located in an opening in the inner gimbal. The gear 155 meshes with gear 156 which is driven by motor 157 secured by bracket 158 to the outer gimbal, and some of the leads 35 serve to energize the motor 157.

As in the case of the slip ring and bearing construction located about the shaft 23 of the outer gimbal, the motor 157 normally oscillates the slip rings 135 and the intermediate race 129 by equal amounts so as to produce equal and opposite friction torques upon the shaft 121, which cancel out. This continual oscillation serves to continually keep the friction upon the shaft 121 in the form of kinetic friction so that movement of the mounting craft about the inner gimbal axis will not produce unwanted torques because of static wiper and bearing friction.

*Bearing construction for inner gimbal*

Figure 6:
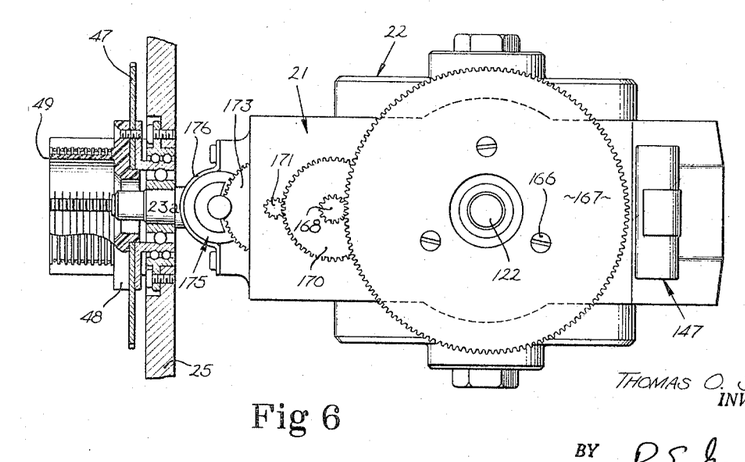
FIGURE 6 is a transverse vertical section, partly in elevation, taken along line 6—6 of FIGURE 2 and illustrating the gear train for moving a bearing race for the inner gimbal.

The shaft 122 supports an inner race 160 for a single row of ball bearings 161, and an outer race 162 for two rows of ball bearings 164, is secured by bolts 163 to the outer gimbal. An intermediate, redundant bearing race 165 is located between ball bearings 161 and 164 and has a flange 166 to which is secured a gear 167. As illustrated in FIGURE 6, the gear 167 meshes with the pinion 168 carried by shaft 169 for larger gear 170, and the larger gear 170 meshes with pinion 171 carried by the shaft 172 for the larger gear 173 which is located in an opening in the outer gimbal. The gear 173 meshes with the pinion 174 which is supported by bracket 176 and is connected with some of the leads 35 passing through shaft 23. As in the case of the other motors, the motor 175 normally oscillates the intermediate race 165 in equal and opposite directions to produce equal and opposite torques on the inner gimbal shaft 122, which cancel out. In this manner, the friction acting upon the inner gimbal shaft will always be kinetic friction of smaller magnitude than static friction normally encountered.

Modified potentiometer structure

Figure 7:
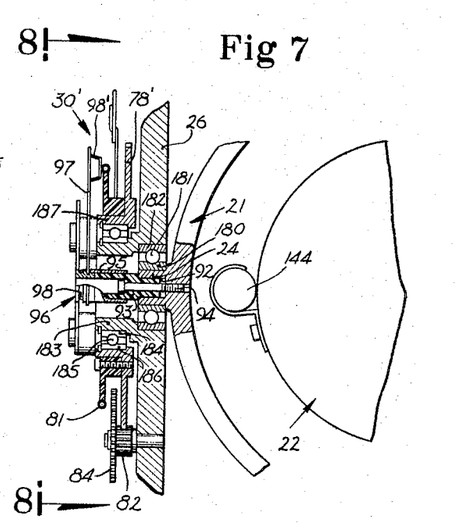
FIGURE 7 is a sectional view of a modification of the invention wherein movement of only the potentiometer winding is utilized for producing an erecting force.
Figure 8:
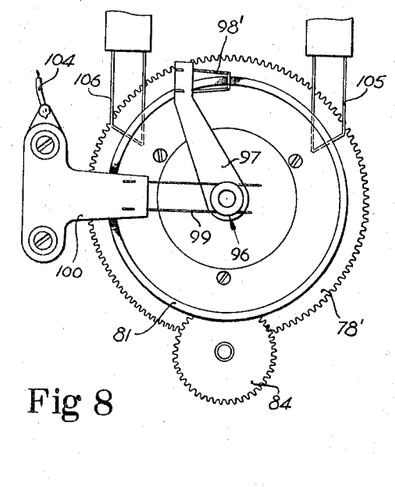
FIGURE 8 is an elevational view taken along line 8—8 of FIGURE 7 showing the fixed leads for the potentiometer winding.

Referring ot FIGURES 7 and 8, a modified potentiometer structure 30' is illustrated wherein only the potentiometer winding is oscillated and no intermediate race for the ball bearings is utilized. As in the prior embodiment, the outer gimbal ring 21 has a shaft 24 containing an opening 92 for receiving the insulated plug 93 which is held in place by the bolt 94. The end 95 of member 96 receives the end of plug 93, and the member 96 has a slip ring 98 for the pair of wipers 99, which are connected with the output lead 104 through the plate 100. Also, the member 96 carries the wiper arm 97 which positions the wiper 98' for contacting with the winding 81. Thus, the construction for securing the wiper 98' to the outer gimbal shaft 24 and for connecting leads to the wiper is the same as in the prior embodiment. However, the shaft 24 carries an inner race 180 which cooperates with ball bearings 181 and outer race 182 for the ball bearings 181' is supported directly by the end 26 of the casing 20. Thus, the bearing support of the shaft 24 is of standard construction and no intermediate race is utilized.

The end 26 of the casing has an annular projection 183 which supports an inner race 184 for the ball bearings 185 and an outer race 186 for these ball bearings is carried by hub 187 of the gear 78'. The gear 78' meshes with the gear 82 secured to the larger gear 84, as in the prior embodiment illustrated in FIGURE 4, so that the motor 88 will drive the gear 78' in the same manner as it drives the gear 78 of the prior embodiment. Also, the wipers 105 and 106 continually bear on the winding 81 at opposite sides of the wiper 98' to produce a potential difference which is picked off by the wiper 98' in order to produce a control signal, and this potential difference is maintained even though the winding 81 is continually in motion.

In the potentiometer structure of FIGURES 7 and 8, only the potentiometer winding 81 is continually in motion and there is no intermediate race for the ball bearings which support the shaft 24. Thus, the outer gimbal 21 is subject to the usual static friction produced by the ball bearings 181 upon the shaft 24. However, the gimbal is subjected only to kinetic friction from the wiper 98' bearing against the winding 81 since these elements are continually in motion. The gear 78' will normally oscillate the winding 81 in opposite directions to continually produce equal and opposite torques which cancel out.

Modified slip ring structure

Figure 9:
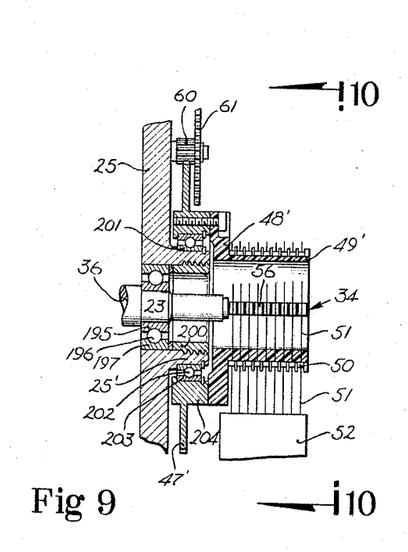
FIGURE 9 is a sectional view of another modification of the invention wherein only movement of the slip rings is utilized for producing an erecting force.
Figure 10:
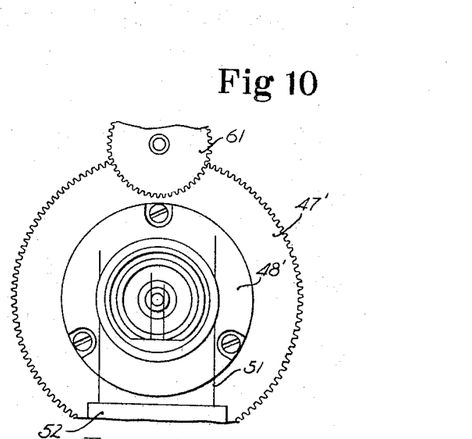
FIGURE 10 is an elevational view taken on line 10—10 of FIGURE 9 showing the slip ring wiper assembly and gear.

Referring to FIGURES 9 and 10, a modified slip ring structure for the outer gimbal is shown supported by the casing end 25. The shaft 23 supports the member 34 which carries the slip rings 56 and these slip rings connect with leads 35 extending through shaft opening 36, as in the prior embodiment. The shaft 23 carries an inner race 195 which engages the balls 196 and the casing 25 carries the outer race 197. Thus, the outer gimbal shaft 23 is supported in the conventional manner, and the bearings 196 can produce static friction torque upon the shaft 23. The casing end 25 has an extension 25' into which is screwed a bearing retainer 200. The extension 25' also carries the inner race 201 for the ball bearings 202 and outer race 203 is secured to hub 204 of the gear 47'. As in the prior embodiment of FIGURE 5, the gear 47' meshes with the small gear 60 secured to the larger gear 61 and the motor 67 continually oscillates the gear 47' and the slip ring support member 48' having the redundant extension 49' secured thereto. The extension 49' carries a plurality of slip rings 50, as in the prior embodiment, which cooperates with pairs of wipers 51 supported by the block 52. Each of the rings 50 connects with a pair of internal wipers 51, as in the prior embodiment, which cooperate with the slip rings 56 in order to conduct electrical energy to the opening 36.

It is apparent that the modification of FIGURES 9 and 10 differ from the slip ring structure for the outer gimbal shown in FIGURE 5 in that an intermediate race is not present in the bearing structure so that the ball bearing can produce static friction. However, only kinetic friction is produced by the slip ring structure since it can be continually oscillated.

Erecting operation

Referring to the embodiment of FIGURES 1–6, as long as the inner gimbal and the outer gimbal are in their positions corresponding to gravity vertical, the motors 67, 88, 157 and 175 will oscillate their respective friction producing member in equal amounts in opposite directions to maintain solely kinetic friction on the shafts of the inner and outer gimbal. Thus, movement of the mounting craft about either of these axes will not produce large unwanted and undesirable torques normally accompanying the higher level of static friction produced in conventional gyroverticals.

When either gimbal deviates from its gravity vertical position, the movement of the friction producing members about the other gimbal axis is utilized to torque the gyro back to its gravity vertical position. Because the slip ring constructions for the inner and outer gimbals are similar, these constructions are utilized to produce the erecting torques and the potentiometer construction for the outer gimbal and the bearing construction for the inner gimbal are continually oscillated solely to eliminate static friction. Thus, the erecting torque about the outer gimbal will be produced by movement of the gear 147 and the erecting torque about the inner gimbal axis will be produced by movement of the gear 131.

By utilizing similar slip ring constructions for erection, the erection torques will be nearly equal about both axes to thereby produce a nearly equal rate of erection about each of the axes. During the time an erection torque is being produced, either about shaft 23 or about shaft 121, the friction producing elements about the outer gimbal shaft 24 and about the inner gimbal shaft 122 will continue to oscillate substantially equal times in opposite directions to produce nearly equal and opposite torques solely to reduce the friction about these axes. However, it is obvious that the erection torques can also be produced by oscillation of the friction members positioned about shaft 122 and about shaft 24. As previously stated, the erection torque is produced by continual movement of the friction producing members in one direction or by moving the members in one direction for a greater time than in the other direction.

Torquing by continuous movement in one direction

Figure 11:
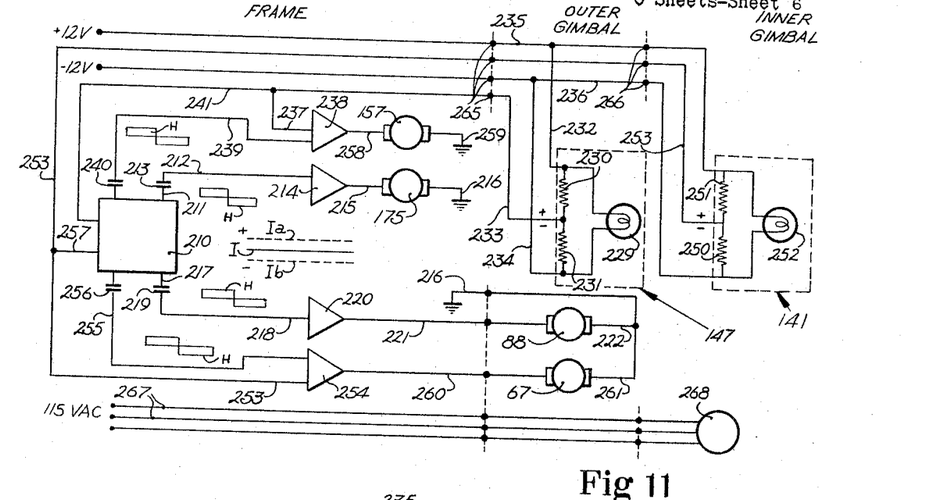
FIGURE 11 is a schematic circuit utilized to control the motors for moving the various erecting members.

Referring to the schematic circuit shown in FIGURE 11, the motors 88 and 175 are driven at equal speeds for equal times in opposite directions in order to continually oscillate the friction producing elements about the outer gimbal shaft 24 and the inner gimbal shaft 122. A wave form generator 210 produces in line 211 the signal illustrated by curve H, and this signal is coupled to line 212 by condenser 213. The line 212 connects with motor 175 through the D.-C. amplifier 214 and line 215, and the motor is connected to ground through line 216. In a similar manner, the same signal H is connected to D.-C. amplifier 220 through line 217, line 218 and condenser 219, and line 221 connects the motor 88 with D.-C. amplifier 220, the motor 88 being connected to ground through line 222.

Since the signal H in lines 212 and 218 goes positive and negative by equal amounts with respect to ground for equal times, it is apparent that the motors 88 and 175 will oscillate in opposite directions at equal speeds and for given time intervals so that the bearing support for shaft 122 of the inner gimbal and the bearing support and wiper construction 30 about the outer gimbal shaft 24 will present only kinetic friction to the gimbal shaft which cancels out.

The gravity sensor 147 positioned on the outer bimbal is illustrated as a photoelectric sensor comprising two cadmium sulphate cells 230 and 231, which are connected by leads 232 and 234 to +12 volt line 235 and to −12 volt line 236, respectively. The lamp 229 is also connected across lines 232 and 234. As the outer gimbal moves from its gravity vertical position, the light intensity on one of the cells 230 or 231 will increase with displacement causing a decrease in the resistance of the cell and a change in signal in the output line 237. As the outer gimbal moves in one direction from the gravity vertical, the voltage in line 237 will go more positive and as it moves in the other direction, the signal will go more negative in proportion to the amount of deviation from the gravity vertical position. When cell 230 is being energized, the signal in the line 237 goes positive and this signal is fed directly to the D.-C. amplifier 238. The D.-C. amplifier 238 is also connected to the function generator 210 through the line 239 and condenser 240. Also, as later explained, the output signal in line 237 is connected directly to the wave form generator through line 241 to change the wave form in line 239.

The gravity sensor 141 carried by the inner gimbal also comprises a pair of cadmium sulphate cells 250, 251 and lamp 252, all of which are connected across lines 235 and 236. The output signal in line 253 goes either positive or negative depending upon which cell is lighted and the magnitude of the signal is proportional to the amount by which the inner gimbal is off the vertical position in either direction. The line 253 connects with a D.-C. amplifier 254 which is also connected to the function generator through the line 255 and condenser 256. As later explained, the output signal line is connected by line 257 to the wave form generator to change the wave form in line 255. The amplifier 238 is connected to the motor 157 through line 258 and the motor is in turn connected to ground through line 259. The output of amplifier 254 is connected to the motor 67 through line 260, and the motor is in turn connected to ground through line 261.

In FIGURE 11, the slip rings between the frame and outer gimbal are designated as 265 and the ring between the outer gimbal and inner gimbal are designated as 266. The power lines 267 are connected with the gyro motor 268.

In normal operation, the wave form generator 210 produces in lines 212, 239, 218 and 255 the signal represented by wave forms H so that all of the motors oscillate at the same speed in opposite directions for equal amounts of time and no resulting erection torques are placed on any of the shafts of the gimbal. However, when the outer gimbal moves away from gravity vertical position and the gravity sensor signal line 237 goes positive, the signal H in the line 239 is cut off by imposing the positive signal in line 241 on the wave form generator, so that the D.-C. amplifier receives only the output voltage in line 237 and the motor 157 is driven continuously in one direction to produce a kinetic friction torque about shaft 121 of the inner gimbal until such time as the outer gimbal is precessed back to its gravity vertical position. Should the signal in the line 237 go negative, this signal in line 241 would also disable the wave form generator 210 through line 241 and eliminate the signal H in line 239. The negative voltage in the line 237 drives the motor 157 in the opposite direction to produce opposite kinetic friction torque about inner gimbal shaft 121 until the outer gimbal is precessed back to its gravity vertical position. Thus, in this mode of operation, the wave form generator produces no bias on the amplifier 238 during erection of the gyro and the bias on the generator goes either positive or negative depending upon the output signal in the line 237. During erection, the motor 157 runs continuously in the same direction until the kinetic friction erects the outer gimbal back to vertical. Thereafter, the signal in the line 237 disappears and the signal H again appears in the line 239 to operate the motor 157 and again oscillate the friction producing members located about inner gimbal shaft 121.

In a similar manner, the inner gimbal gravity sensor 141 produces either a positive or negative signal in line 253 and this signal disables the signal H in the line 255 produced by the wave form generator. Thus, if the line 253 is negative, the motor 67 will be continuously driven in one direction to rotate the friction producing members about the outer gimbal shaft 23 to bring the inner gimbal back to gravity vertical position, and if the signal is positive, motor 67 will be continuously driven in the opposite direction to bring the inner gimbal back to vertical. After the signal in the line 253 disappears upon the gravity vertical position of the inner gimbal being reached, the signal H will again appear in line 255 and the motor 67 will again oscillate in equal and opposite amounts at equal speeds in order to place kinetic friction upon the shaft of the outer gimbal.

The speed of the motors 67 and 157 during erection will, of course, vary with the magnitude of the voltage signal, which in turn is proportional to the amount of deviation from the gravity vertical position. The curve I illustrates the normal voltage level in lines 237 and 253 when the gimbals are in gravity vertical position. When the voltage in line 237 or line 253 is positive, the voltage on the amplifier 238 or amplifier 254 will be along line $I_a$ and when the voltage is negative, the bias will be along line $I_b$.

*Torquing by constant amplitude movement at different speeds*

Figure 12:
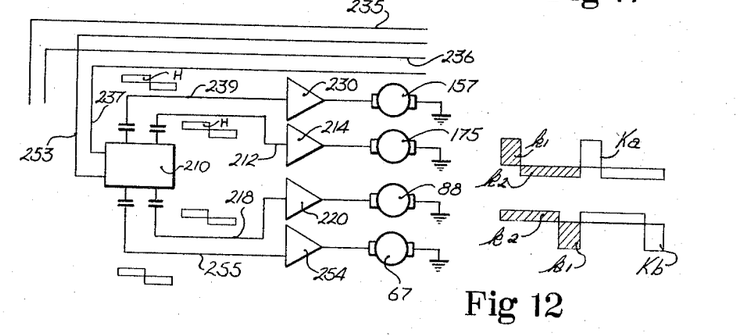
FIGURE 12 is a modified schematic circuit in which separated wave forms are utilized for erection in opposite directions.

In another form of operation accomplished by the modified schematic of FIGURE 12, the wave form generator places the signal H in the lines 212, 218, 239 and 255 as long as the gyro is in its gravity vertical position. However, should a negative or positive signal appear in the line 237 or in line 253, the wave form generator will be disabled and the signal H will disappear from line 239 or the line 255. At the same time, a positive signal in line 237 or line 253 would produce the output curve $K_a$ into the line 237 or 253 so that the motor 157 or 67 would run faster for a shorter period of time in a first direction and slower for a longer period of time in the opposite direction. However, if a negative signal should appear in line 237 or line 253, the curve $K_b$ would be produced by the function generator in line 239 or line 255 so that the motor 157 or 67 would run at a slower speed for a greater length of time in the first direction and at a higher speed for a shorter length of time in the opposite direction. Since the areas $k_1$ and $k_2$ are equal for both curves $K_a$ and $K_b$, the distance of oscillation in each direction will be constant but the motor 157 or 67 will move for a longer time in one direction than in the other. Also, since the amount of torquing force placed upon the gimbal is substantially independent of the speed of rotation of the motor driving the friction torquing members, there is produced a net effective torque on the gimbal in the direction in which the motor runs slower and longer, even though the amplitude of movement in opposite directions is the same.

*Torquing by oscillation for different times in opposite directions*

Figure 13:
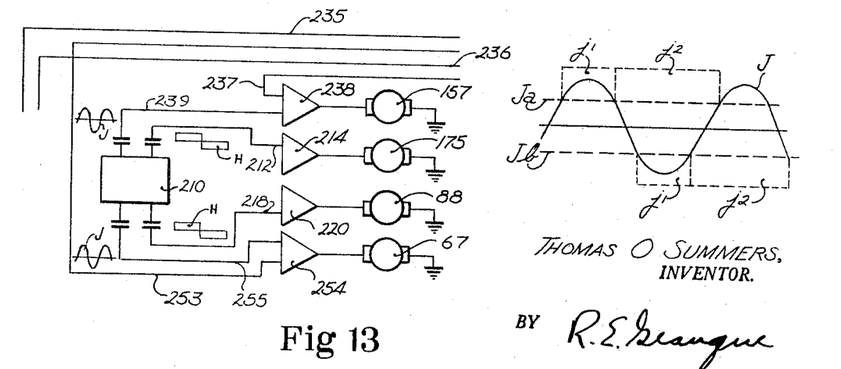
FIGURE 13 is a modified schematic circuit in which a sine wave is biased to obtain erection in opposite directions.

In another form of operation accomplished by the modified schematic of FIGURE 13, the function generator 210 continually produces a sinusoidal wave J in the lines 239 and 255, and so long as there is no signal in the output lines 237 and 253, the motors 67 and 157 will both rotate in opposite directions for equal times. When a positive signal appears in line 237 or the line 253, this bias, illustrated as line $J_a$, will appear on amplifier 238 or 254 and it is apparent that the motor 157 or 67 will run for a longer period of time in one direction than the other since the distance $j_1$ is less than distance $j_2$ on the line J. Should the bias in these lines go negative, the bias illustrated as line $J_b$, will appear on the associated amplifier, and it is apparent that the motor 157 or 67 will run longer in the opposite direction than in the first direction. Thus, there will be a net torque produced upon the associated gimbal shaft of motor 157 or 67 causing erection in the direction to eliminate any signal in line 237 or 253. At the same time as the signal J is being produced by the function generator in lines 239 and 255, the signal H is present in the lines 212 and 218 to continually oscillate the element driven by the motors 88 and 175.

*Summary*

It is obvious that the motors 157 and 175 can be reversed in the schematics of FIGURES 10–12 so that the outer gimbal will be erected solely by movement of the intermediate race 165 about the inner gimbal shaft 122 by the motor 175 and the friction producing members about the shaft 121 will be continually oscillated by motor 157 in response to the signal H. In the same manner, the motors 88 and 67 can be reversed so that the inner gimbal is erected solely by movement of the winding 81 about the outer gimbal shaft 24 by motor 88 and the friction producing members about the shaft 23 will be continuously oscillated by motor 67 in response to signal H. Thus, the invention contemplates the production of a kinetic friction erecting torque about any gimbal shaft by oscillation of only an intermediate race for the bearings, or by oscillation of a redundant slip ring member or an element of a potentiometer along with an intermediate race. Finally, it is apparent that the signal H can be eliminated entirely during erection and that the motors about both shafts of either the inner or outer gimbal can be driven in the proper direction or oscillated in the desired manner to obtain erection of the gyro; it being understood that resultant torque produced about each shaft of a gimbal would be in the proper direction to be additive and produce the desired torque direction.

Referring to the modification illustrated in FIGURES 7 and 8, only the potentiometer winding 81 is driven by the motor 88 and it is apparent that this single friction producing member can be moved for erection purposes when motor 88 is switched with motor 67 in the schematics of FIGURES 11–13. Similarly, in the modification of FIGURES 9 and 10, only the redundant slip ring 49' is driven by the motor 67 and it is apparent that this single friction producing member can be driven for erection purposes when the motor 67 is connected as in the schematics of FIGURES 11–13. Thus, either a bearing member, or a potentiometer member or a slip ring member can be moved for erection, and either of the latter two members can be associated with a bearing member for this purpose.

The present invention relates broadly to the producing of an erection force by the controlled movement of one or more friction producing elements about one or more gimbal shafts. These friction producing elements can be ball bearing members, slip ring members, or potentiometer members, either singularly or in any combination. Also, while three examples have been given of the manner in which the erecting motors can be driven to produce the erecting force, it is obvious that other types of operation can be utilized to produce net erecting torques in one direction or the other through the kinetic friction of the members about the gimbal shafts. It is understood that the wave form generator 210 contains well-known circuitry for producing the wave forms H, J and $Ka$ and $Kb$ and for interrupting or switching these wave forms and that other wave forms can be produced by the generator to produce a net torque on the gimbals of the gyrovertical. Other modifications are contemplated by those skilled in the art without departing from the spirit and scope of the invention as hereinafter defined by the appended claims.

What is claimed is:

1. An erecting mechanism for a gyrovertical having inner and outer gimbals comprising:
 a gravity sensor carried by one of said gimbals for producing an erection signal when said one gimbal moves away from its gravity vertical position;
 a shaft for supporting the other of said gimbals;
 friction producing means rotatable relative to said shaft thereby producing kinetic friction torque about said shaft; and
 motor means energized by said erection signal for rotating said friction producing means to produce a net kinetic friction torque on said shaft in a direction to return said one gimbal to its gravity vertical position.

2. An erecting mechanism as defined in claim 1 wherein said friction producing means comprises:
 ball bearings supporting said shaft; and
 a rotatable redundant bearing race engaging said ball bearings on the side opposite from said shaft, said rotatable bearing race being rotated by said motor means for producing kinetic friction between said ball bearings and said shaft.

3. An erecting mechanism as defined in claim 1 having a potentiometer wiper arm connected with said shaft, said friction producing means comprising:
 a winding supported for rotation relative to said shaft and rotated by said motor means; and
 a wiper carried by said wiper arm and bearing against said winding to produce kinetic friction torque on said shaft during movement of said winding.

4. An erecting mechanism as defined by claim 1 having first slip ring elements supported by said shaft, said friction producing means comprising:
 a redundant slip ring member carrying second slip ring elements and supported for rotation relative to said shaft by said motor means and first wiper members carried by said slip ring member and connecting said first and second slip ring elements; and
 second stationary wiper members engaging said second slip ring elements, the rotation of said slip ring member producing kinetic friction between said slip ring elements and said wiper members resulting in a torque about said shaft.

5. An erecting mechanism as defined in claim 1 having a potentiometer wiper connected with said shaft, said friction producing means comprising:
 ball bearings supporting said shaft;
 a rotatable redundant bearing race engaging said ball bearings on the side opposite from said shaft; and
 a winding supporting by said redundant bearing race and engaged by said wiper, said rotatable bearing race being rotated by said motor means for producing kinetic friction between said ball bearings and said shaft and between said wiper and said winding to produce kinetic friction torque on said shaft.

6. An erecting mechanism as defined in claim 1 having first slip ring elements supported by said shaft, said friction producing means comprising:
  ball bearings supporting said shaft;
  a rotatable redundant bearing race engaging said ball bearings on the side opposite from said shaft;
  a redundant slip ring member carrying second slip ring elements and supported by said redundant bearing race;
  first wiper members carried by said slip ring member and connecting said first and second slip ring elements; and
  second stationary wiper members engaging said second slip ring elements, said rotatable bearing race being rotated by said motor means for producing kinetic friction between said ball bearings and said shaft and between said slip ring elements and said wiper members resulting in a torque about said shaft.

7. An erecting mechanism for a gyrovertical having inner and outer gimbals comprising:
  a gravity sensor carried by one of said gimbals for producing an erection signal when said one gimbal departs from its gravity vertical position;
  a shaft for supporting the other of said gimbals;
  friction producing means rotatable relative to said shaft thereby producing a kinetic friction torque about said shaft;
  motor means for rotating said friction producing means; and
  circuit means connecting said motor means with said gravity sensor for controlling and energizing said motor means when said one gimbal moves away from its gravity vertical position.

8. An erecting mechanism as defined in claim 7 wherein said gravity sensor comprises:
  means for producing a positive erection signal while said one gimbal is displaced from gravity vertical position in one direction and for producing a negative erection signal while said one gimbal is displaced in the other direction,
  said circuit means connecting said erection signal to said motor means for driving said motor means in one direction when said signal is positive and in the opposite direction when said signal is negative, said friction producing means being driven by said motor means continually in a single direction to erect said one gimbal to its gravity vertical position.

9. An erecting mechanism as defined in claim 8 having wave form generator means connected with said motor means for normally oscillating said motor means for equal times in opposite directions,
  said circuit means being connected with said generator means for disabling said generator means upon the occurrence of an erection signal.

10. An erecting mechanism as defined in claim 7 wherein said gravity sensor comprises:
  means for procing a positive erection signal while said one gimbal is displaced from gravity vertical position in one direction and for producing a negative erection signal while said one gimbal is displaced in the other direction.
  said circuit means comprising wave form generator means connected with said motor means and having an output normally oscillating said motor means for equal times in opposite directions, said generator output being biased with said erection signal for causing rotation of said motor means longer in one direction than in the opposite direction so that said friction producing means produces a net erection torque in said one direction.

11. An erecting mechanism as defined in claim 7 wherein said gravity sensor comprises:
  means for producing a positive erection signal while said one gimbal is displaced from gravity vertical position in one direction and for producing a negative erection signal while said one gimbal is displaced in the other direction,
  said circuit means comprising wave form generator means connected with said motor means and having an output normally oscillating said motor means for equal distances in opposite directions at the same speed, said erection signal being connected with said generator means for changing the output thereof to cause said motor means to oscillate at different speeds in opposite directions while continuing to move equal distances, the polarity of said erecting signal determining the direction of lesser speed and of the net erecting torque.

12. In a gyrovertical having a casing containing a rotor supported by inner and outer gimbals:
  a gravity sensor carried by each gimbal for producing an erection signal when the supporting gimbal departs from its gravity vertical position;
  a first pair of outer gimbal shafts supported by said casing;
  a second pair of inner gimbal shafts supported by said outer gimbal;
  friction producing means located adjacent to and rotatable relative to one shaft of each pair of said shafts;
  motor means connected with said friction producing means for rotating same relative to the associated shaft; and
  circuit means for driving said motor means to normally oscillate the friction producing means associated with each shaft for equal times in opposite directions,
  said circuit means being connected with each of said gravity sensors so that the movement of the friction producing means about one shaft of each pair is controlled upon occurrence of an erection signal from one of the gravity sensors to have a net time of erecting movement in a direction determined by the direction in which the gimbal carrying said one gravity sensor is off gravity vertical.

13. In a gyrovertical as defined in claim 12, wherein said friction producing means about each one shaft of each pair comprises:
  ball bearings supporting said one shaft; and
  a rotatable redundant bearing race engaging said ball bearings on the side opposite from said shaft.

14. In a gyrovertical as defined in claim 13, including:
  a redundant slip ring member secured to said redundant bearing race;
  first wiper members carried by the support for said one shaft and engaging said redundant slip ring member;
  slip ring elements carried by said one shaft; and
  second wiper members carried by said redundant slip ring member and engaging said slip ring elements.

15. In a gyrovertical as defined by claim 13, including:
  a potentiometer wiper arm connected with said one shaft;
  a winding secured to said redundant bearing race; and
  a potentiometer wiper carried by said wiper arm and bearing against said winding.

16. In a gyrovertical as defined in claim 12 having second friction producing means about one of the other shafts of one pair comprising:
  ball bearings supporting said one other shaft; and
  a rotatable redundant bearing race engaging said ball bearings on the side opposite from said one other shaft.

17. In a gyrovertical as defined in claim 16, including:
  a redundant slip ring member secured to said redundant bearing race;

first wiper members carried by the support for said one other shaft and engaging said redundant slip ring member;
slip ring elements carried by said one other shaft; and
second wiper members carried by said redundant slip ring member and engaging said slip ring elements.

18. In a gyrovertical as defined in claim 16, including:
a potentiometer wiper arm connected with said one other shaft;
a winding secured to said redundant bearing race; and
a potentiometer wiper carried by said wiper arm and bearing against said winding.

References Cited by the Examiner

UNITED STATES PATENTS

| 2,485,953 | 10/1949 | Barth | 74—5.45 |
| 3,082,629 | 3/1963 | Jones et al. | 74—5 X |

FOREIGN PATENTS

| 760,333 | 10/1956 | Great Britain. |

FRED C. MATTERN, Jr., *Primary Examiner.*

BROUGHTON G. DURHAM, *Examiner.*

T. W. SHEAR, *Assistant Examiner.*